United States Patent [19]
Bowker

[11] 3,878,384

[45] Apr. 15, 1975

[54] GENERAL PURPOSE DESIGNATOR FOR DESIGNATING THE CLASS TO WHICH AN UNKNOWN EVENT BELONGS AMONG A PLURALITY OF POSSIBLE CLASSES OF EVENTS

[76] Inventor: John Kent Bowker, 4 Elm Pl., Marblehead, Mass. 10945

[22] Filed: Dec. 4, 1973

[21] Appl. No.: 421,703

Related U.S. Application Data

[63] Continuation-in-part of Ser. No. 181,141, Sept. 3, 1971, Pat. No. 3,778,541.

[52] U.S. Cl.............................. 235/151.3; 235/151
[51] Int. Cl. ........................................... G06f 15/34
[58] Field of Search ........ 235/193, 150, 151, 151.3, 235/150.1, 92 PC; 444/1; 250/226; 356/176, 39, 102

[56] References Cited
UNITED STATES PATENTS

| | | | |
|---|---|---|---|
| 3,504,164 | 3/1970 | Farrell et al. ......................... | 235/150 |
| 3,602,706 | 8/1971 | Levitt.................................... | 235/193 |
| 3,752,590 | 8/1973 | Frappé............................ | 250/226 X |

*Primary Examiner*—Joseph F. Ruggiero
*Attorney, Agent, or Firm*—Homer O. Blair; Robert L. Nathans; Gerald H. Glanzman

[57] ABSTRACT

General purpose designation method and apparatus for designating the class to which an unknown event or observation belongs among a plurality of possible classes. In the most generalized sense, designation is accomplished by establishing a multidimensional coordinate system in which each axis represents a different selected property or characteristic that is relevant to the particular designation operation being carried out and then locating the position of each of the plurality of classes and the position of the unknown event in the coordinate system in accordance with their respective selected property values. Thereafter, the vector distances from the position of the unknown event to each of the class positions are determined and compared with one another to identify the class which is the shortest vector distance from the unknown event. That class will have selected property values which are, collectively, most similar to those of the unknown event and, accordingly, will be the class with which the unknown event will be designated.

The system is also provided with several additional features including a "self-training" capability and the ability to recognize ambiguities due to system noise to enable other significant information to be obtained relative to the designation operation. The system provided can be utilized to perform essentially any type of designation or classification activity in a rapid and efficient manner.

19 Claims, 7 Drawing Figures

GENERAL PURPOSE DESIGNATOR FOR DESIGNATING THE CLASS TO WHICH AN UNKNOWN EVENT BELONGS AMONG A PLURALITY OF POSSIBLE CLASSES OF EVENTS

This application is a continuation-in-part of U.S. Pat. application Ser. No. 181,141 of John Kent Bowker, now U.S. Pat. No. 3,778,541, filed Sept. 3, 1971, and entitled SYSTEM FOR ANALYZING MULTICOLORED SCENES which patent is incorporated by reference herein.

BACKGROUND OF THE INVENTION

1. FIELD OF THE INVENTION

The present invention relates generally to a method and apparatus for designating or classifying an event or observation. More particularly the present invention relates to a method and apparatus for automatically designating the class to which an unknown event or observation belongs among a plurality of possible classes by comparing their characteristics or properties.

2. DESCRIPTION OF THE PRIOR ART

In the above referred to U.S. patent application Ser. No. 181,141, a system is described for analyzing and recording image detail boundaries and color distribution in a multicolored scene for producing diagrammed work surfaces on which relatively unskilled persons can create artistic renderings of the multicolored scene. In this system, each color available on a pallette of paints is plotted into a three-dimensional coordinate system in which each axis represents the red, blue and green component thereof. Thereafter, the color on a spot of the scene is separated into its three color components and also plotted into the coordinate system in accordance with its component values. Then, the vector distance from the plotted position of the unknown color to the plotted position of each of the known colors on the pallette are measured and compared. After this comparison is completed, the pallette color position which is the shortest vector distance from the unknown scene color will identify the color from the pallette that is most similar to and should be used in the rendering of that particular portion of the scene.

The above described system can be considered as a special purpose designator system by which an unknown color can be designated as being most similar to one of a plurality of known colors.

The ability to perform designations of the above type is also useful in many other fields as well. For example, in diagnosing the ailment of an automobile engine, one might examine or measure certain significant characteristics of the engine such as its sound, its exhaust gases and the like and then compare this obtained data with known data that has previously been ascertained to indicate a particular ailment. If the measured characteristics are similar to the known characteristics representing faulty valves, for example, it can then be assumed (subject to the accuracy and completeness of the measurements) that the test engine also has faulty valves.

As another example, in certain aerial reconnaisance operations, it might become necessary to identify the type of crop that is growing in a particular field. By gathering certain pertinent data, such as the crop's color and density, the time of year, the time of day and so forth, and then comparing this data with corresponding data for known crops under similar conditions, the unknown crop can be ascertained.

In the prior art, a variety of systems have been developed which can assist in designating unknown observations such as the above. In general, these are highly specialized devices designed to perform specific designation operations and frequently, they require substantial amounts of human judgment.

General purpose designators which do exist in the prior art are not fully adequate. As a rule, these systems utilize multivariant analysis to provide information regarding the probability that a particular event belongs in a certain class. In such systems, since the laws of probability are used, a great deal of data is usually necessary to define variants in the data distribution when it is not Gaussian. This makes such systems extremely complex and quite limited in their capabilities.

In general, no system exists which is capable of effectively performing a wide variety of designation activities in a manner that makes it effective in essentially any type of application without significant modification.

SUMMARY OF THE PREFERRED EMBODIMENT

In accordance with a preferred embodiment, the present invention provides a general purpose system for designating an unknown event or observation into one of plurality of possible classes by identifying certain properties of that event and then determining which class has properties which are, collectively, most similar to those of the unknown event. (In this disclosure, the terms "event" and "observation" are used interchangeably to refer to any type of unknown which is to be designated while the terms "property" or "characteristic" are used to refer to any type of data pertinent to the designation operation whether it be data regarding the unknown itself, a significant environmental condition, a time period, or the like.)

The manner in which the designation is accomplished in accordance with the present invention may be understood by imagining a multidimensional coordinate system wherein each coordinate axis represents one of the properties being measured. For example, in a very simple four-dimensional system, the four axes might represent four properties such as diameter, area, opacity and weight. Each known class is plotted in this four-dimensional coordinate system in accordance with the particular value of its weight, diameter, opacity and area. These same properties are then measured for the unknown event and it is also plotted into the coordinate system. Then, by an iterative process which will be explained in greater detail hereinafter, the vector distance between the position of the unknown event and the position of each of the known classes are determined and the class which is the closest vector distance from the unknown event will be the class that the unknown event is most similar to and, therefore, the class that it is assigned to.

By this general technique, essentially any type of property or characteristic capable of being ascertained can be programmed into the system, and accordingly, practically any type of event or observation can be readily designated. The system is extremely flexible and can be effectively used whether the number of classes be immensely large or quite small. The number of properties to be compared in the designation operation can also be as few or as many as the particular application requires subject only to the number of input channels provided in the system.

In addition to classifying an event into one of a plurality of known classes, the present invention also has many other important capabilities. For example, in many applications the system can be "trained" to recognize similarities or differences in the properties of unknown events and to establish new classifications indicative of them. Furthermore, the system can, to a substantial degree, provide information regarding the possible effect of system noise on the accuracy of the designation by determining the difference between the shortest and second shortest vector distances.

In general, the present invention provides a general purpose designator having a great many capabilities not found in the prior art. Furthermore, it does not require complex mathematical computations or extensive human judgment. Yet further features of the invention as well as a clearer understanding thereof will be found hereinafter in conjunction with the following detailed description.

DETAILED DESCRIPTION OF THE PREFERRED EMBODIMENT

Figure 1:
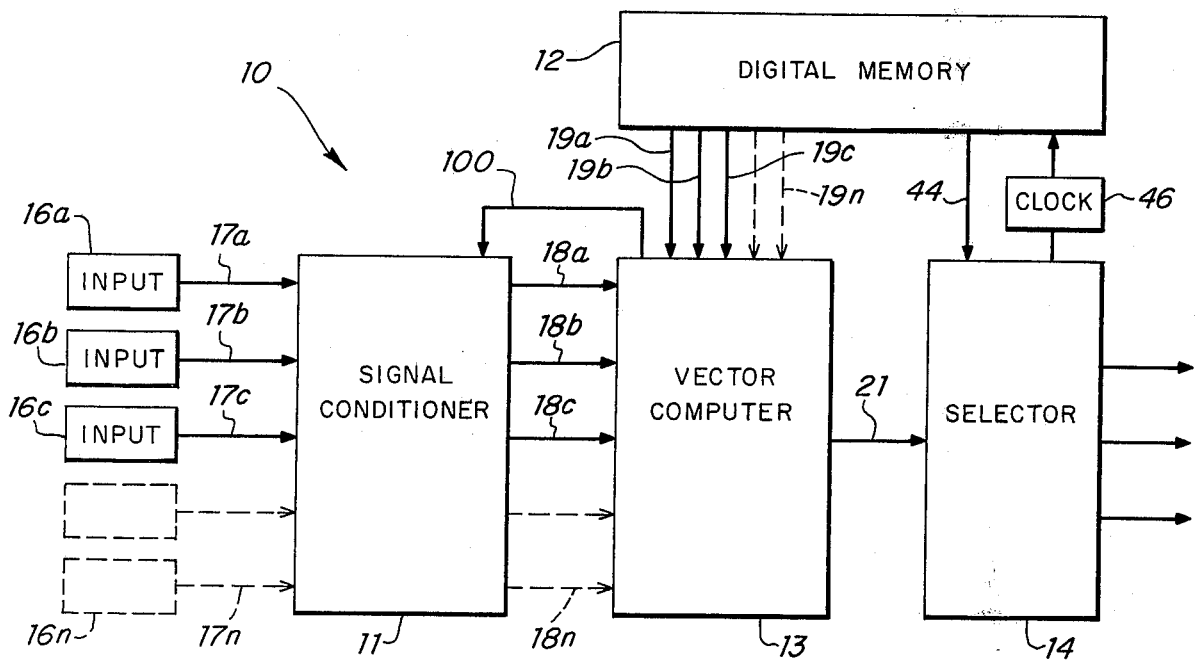
FIG. 1 schematically illustrates the designating system in accordance with a presently preferred embodiment of the invention.

FIG. 1 illustrates the general overall designating system 10 in accordance with a presently preferred embodiment of the invention. As illustrated, the system is composed of four basic elements; a signal conditioner 11, a digital memory 12, a vector computer 13 and a selector 14.

The signal conditioner 11 is basically provided to receive signals from input data sources $16a$, $16b$, $16c$..., $16n$ on channels $17a$, $17b$, $17c$..., $17n$ and to process those signals in a manner to enable them to be more effectively processed by the vector computer. Specifically, each of the inputs, $16a$, $16b$, $16c$, etc., comprises suitable structure for generating (or storing) signals corresponding to a particular property or characteristic that is relevant to designating or classifying a specific event or observation. As an example, if the unknown item to be classified is a blood cell, input $16a$ might comprise a system for detecting the weight of the unknown blood cell and for generating a suitable analog signal on line $17a$ indicative of that weight to be fed into signal conditioner 11. In the same manner, input $16b$ might detect the area of the blood cell while input $16c$ might detect the opacity of the blood cell and transmit signals representative of these properties to the signal conditioner via lines $17b$ and $17c$, respectively. Other inputs may also be provided to provide data relative to other properties as might be needed for the particular application desired as illustrated in dotted line.

The manner in which the signal conditioner 11 will process the signals fed into it will depend, to a great extent, on the type of data that is involved. In this regard, it will preferably include a sample and hold amplifier for each input channel so as to be able to "freeze" a signal that is apt to change during the designation time. Additionally, signal conditioner 11 will preferably also include appropriate electronics to modify the input signal from each channel to ensure that meaningful increments in each dimension become everywhere equal and uniform. Also, it would include appropriate circuitry to convert the input signals into a more useful form for processing. For example, where several or all of the inputs correspond to color information, log amplifiers might be provided to convert the signals into a form that closely approximates human response to color. As other examples, structure might be provided to convert a periodic input into phase and amplitude signals or to invert frequency signals to quefrency signals which is believed by some to be of particular value in human speech recognition applications. In general, the function of the signal conditioner 11 is to convert incoming signals into forms which are more useful and informative for the specific designation or classification problem of interest and a great many other functions similar to the examples given above will be readily apparent to those skilled in the art.

The vector computer 13 is adapted to receive the processed signals from signal conditioner 11 on lines $18a$, $18b$, $18c$..., $18n$ and to also receive similar data from digital memory 12 on lines $19a$, $19b$, $19c$..., $19n$ which represent data for the known classes into one of which the unknown item is to be classified. The operation of the vector computer will be explained in detail in conjunction with FIGS. 2–7 but basically its function is to establish a multidimensional coordinate system, locate the positions of each of the class entries from memory 12 in that coordinate system, locate the position of the unknown item from the signal conditioner in the coordinate system, and finally measure the vector distance from the unknown item position to each of the class entry positions. This information is then fed to the selector 14 on line 21 within which these vector distances are compared with one another. Basically, the class entry that is the shortest vector distance from the unknown item identifies the class whose collective properties are most similar to the unknown item and to which the unknown item is assigned.

In order to permit a clearer understanding of the invention, it is believed that a highly simplified example graphically depicting the operation of the vector computer and selector would be helpful. For our example, let it be assumed that we desire to classify an unknown blood cell X into one of four different known types or classes of blood cells A, B, C and D. Further, to keep the example extremely simple and to permit two-dimensional illustration, let it be assumed that the properties which distinguish one blood cell type from another are their area and opacity. In real life, a great many other properties such as weight, diameter, light scattering ability and so forth would likely be critical as well and would also have to be taken into consideration.

Figure 2:
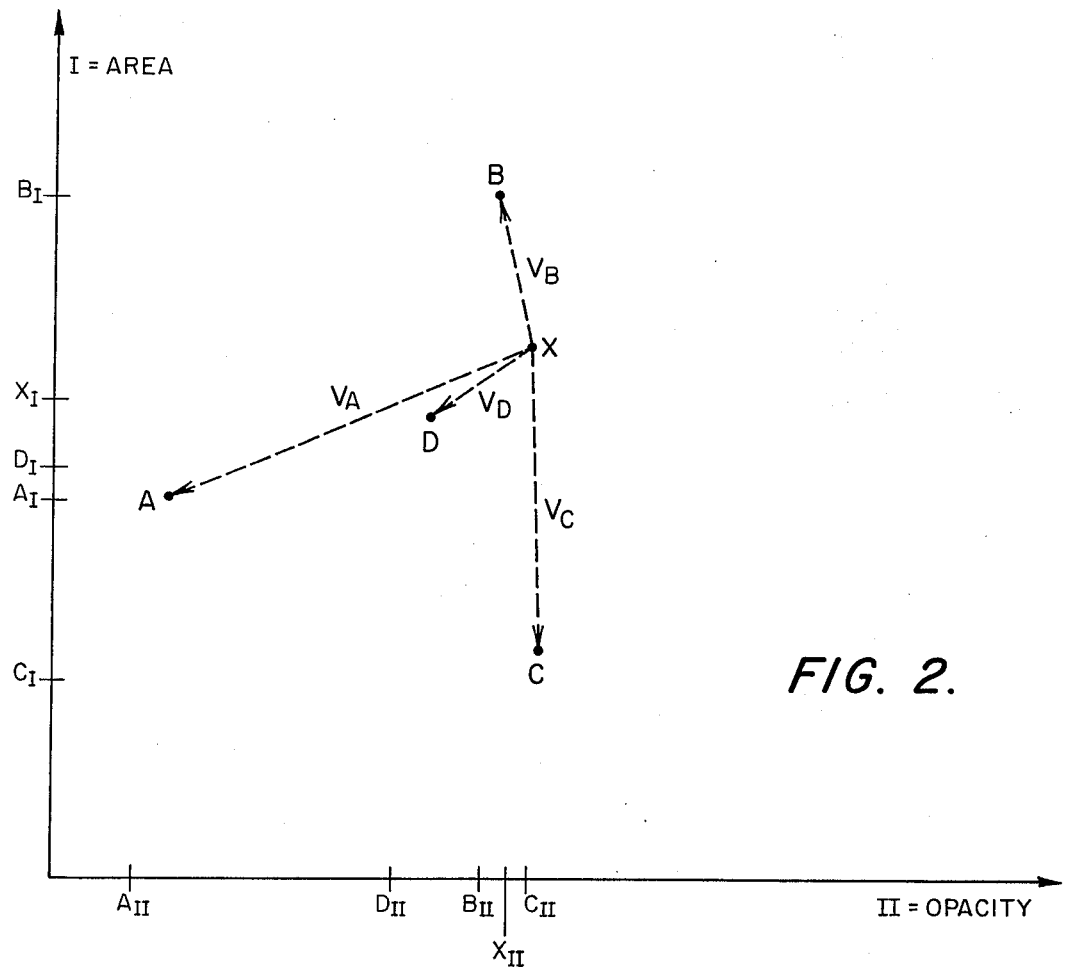
FIG. 2 is a graphical representation of the basic operation of the system of FIG. 1.

The manner in which the designation is accomplished is graphically illustrated in FIG. 2. In FIG. 2 is shown a two-dimensional coordinate system having axes I and II wherein one of the axes (e.g., axis I) represents one of the critical properties, (area), while the other axis (e.g., axis II) represents the other critical property (opacity). The coordinate system is in two dimensions because there are two critical properties. In practice, there will be as many dimensions as there are properties.

The four known classes, since their area and opacity are known, may then be plotted into the coordinate system in accordance with the values of their properties, i.e., blood cells of Class A have an area and opacity of $A_I$ and $A_{II}$, respectively, while Classes B, C and D have areas and opacities of $B_I$, $B_{II}$; $C_I$, $C_{II}$ and $D_I$, $D_{II}$, respectively, as illustrated. Thereafter, the blood cell X of unknown type is examined to measure its area $X_I$ and opacity $X_{II}$ and it is also plotted into the coordinate system of FIG. 2 as shown. Thereafter, the vector distance from the plotted position of X to the plotted position of each of the classes is calculated ($V_A$, $V_B$, $V_C$ and $V_D$) and this information is directed to the selector 14 which compares these distances and determines which is the shortest. As shown in FIG. 2, $V_D$ is the shortest vector which indicates that blood cell X has property values which are, collectively, most similar to those of bllood cell Class D, and, accordingly it will be designated as falling into Class D.

It should be emphasized at this point that in many, if not most applications, the various known classes will not be truly represented by a single point in the coordinate system as is shown in FIG. 2. In practice, the properties of various samples may differ from one another within substantial ranges and still all be in the same class. Therefore, in the usual situation, Classes A, B, C and D will actually occupy areas or domains in the coordinate system. In such a situation, however, classifications are accomplished by ascertaining one or more "aim points" from which vector distances to the unknown samples are measured. This concept will be further clarified hereinafter.

Figure 3:
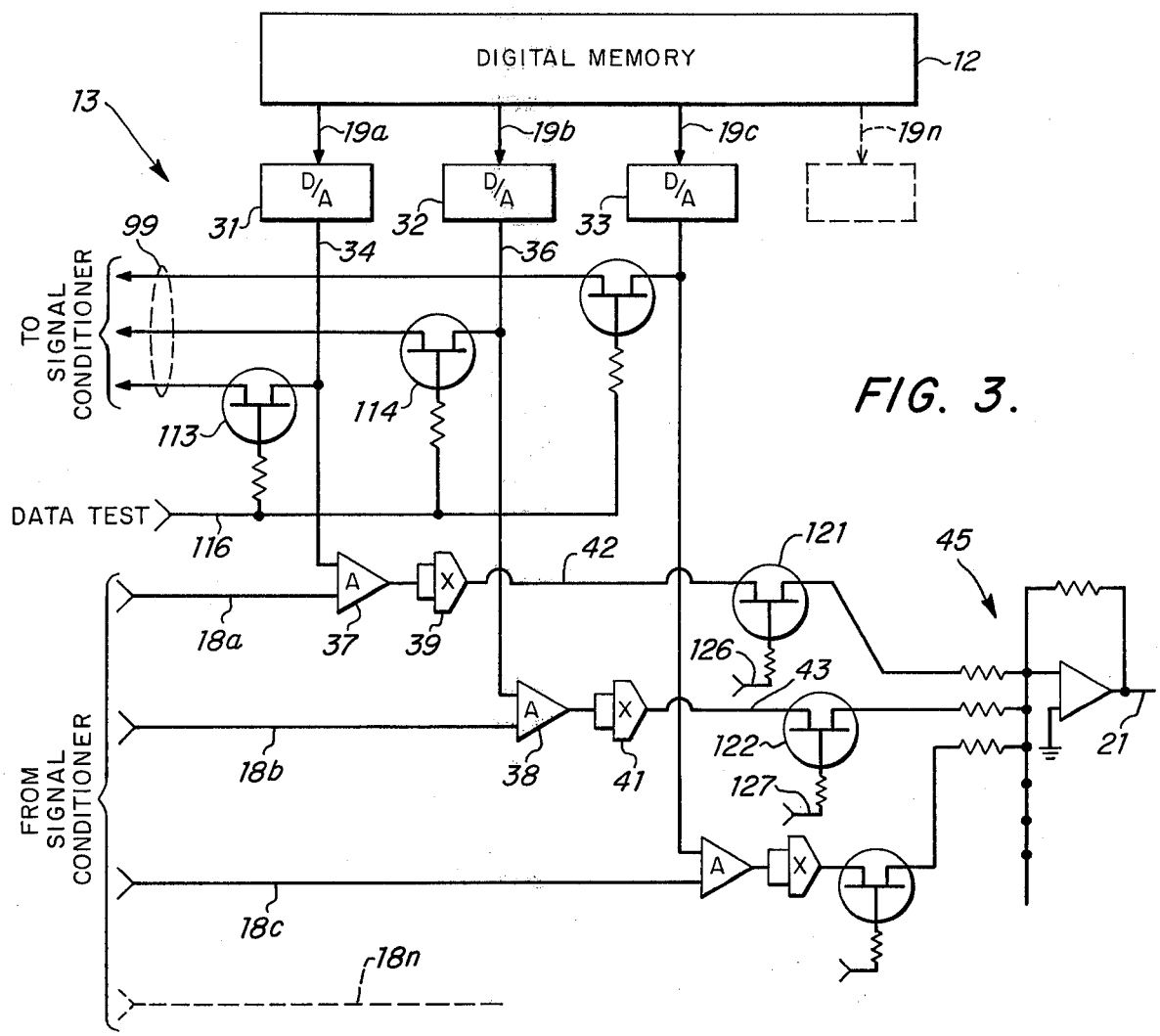
FIG. 3 schematically illustrates the vector computer of FIG. 1 in greater detail.
Figure 4:
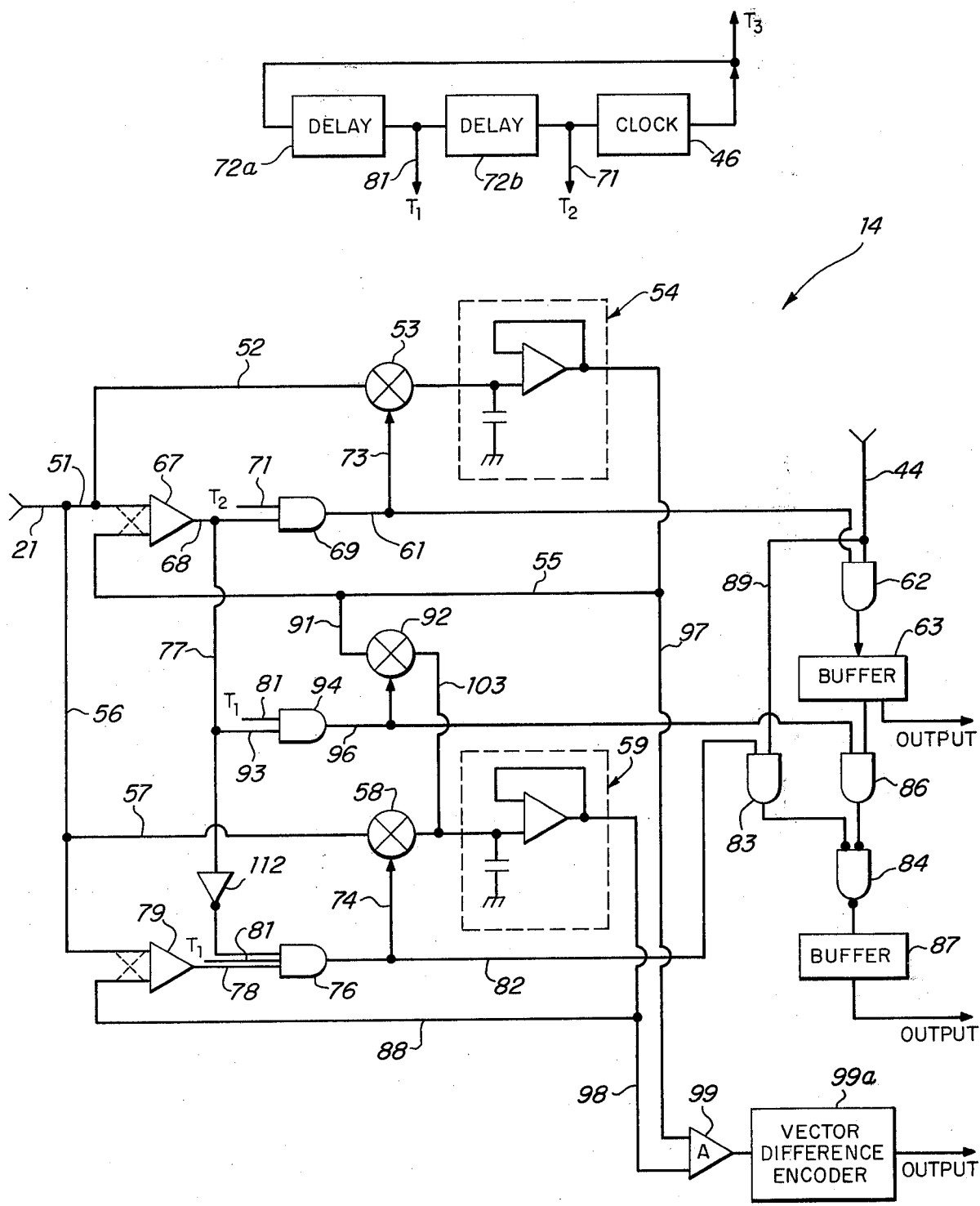
FIG. 4 schematically illustrates the selector of FIG. 1 in greater detail.

FIGS. 3 and 4 illustrate the vector computer 13 and the selector 14, respectively, in greater detail in order to explain their operation for performing the designation operation graphically illustrated in FIG. 2. The input signals corresponding to the measured properties of the unknown sample, i.e., blood cell X, after being suitably processed, if desired or needed, by signal conditioner 11, FIG. 1, are fed along lines 18a and 18b to the vector computer as shown in FIG. 3 as analog signals proportional to the values of the measured properties, i.e., area and opacity. In an actual operation there will be many other inputs to the vector computer 18c. . . , 18n to permit a great many other properties to be taken into consideration. Also, corresponding area and opacity data for each of the known classes, A, B, C and D, which have been previously stored in digital memory 12 are sequentially fed (one class at a time) along lines 19a and 19b to digital to analog converters 31 and 32 where they are converted to appropriate analog signals corresponding to and dimensionally consistent with those coming in on lines 18a and 18b, respectively. Similarly, additionally inputs 19c. . . , 19n to additional digital to analog converters 33, etc., are also provided for further properties. The increase in the number of inputs will merely entail adding on additional circuit components similar to those shown.

The analog area data from the unknown sample on line 18a ($X_I$ of FIG. 2) and the analog area data from a known class on line 34 ($A_I$ in FIG. 2) are then fed into difference amplifier 37 where the input voltage on line 34 is subtracted from the input voltage on line 18a. A similar process is followed in difference amplifier 38 wherein the analog opacity data from line 36 ($A_{II}$) is subtracted from the analog opacity data on line 18b ($X_{II}$). These differences are then squared by squaring networks 39 and 41, respectively, to yield the values $(X_I-A_I)^2$ and $(X_{II}-A_{II})^2$ on lines 42 and 43, respectively. These values are then fed to a summing bus 45 and added together to yield the square of the vector distance $V_A$ (Euclidian distance) from the input data to the particular class aim point A on line 21 for receipt by the selector 14.

In a similar manner the vector computer 13 is also utilized to sequentially determine the vector distances from X to each of the other class aim points B, C and D (under control of clock 46, FIG. 1). These vector distance signals are fed to the selector 14 one at a time and compared with one another in order to determine the proper designation for the unknown item X in the following manner with reference to FIG. 4 which illustrates the selector structure in greater detail.

As illustrated in FIG. 4, the signal from the vector computer proportional to the vector distance that has just been computed is directed along lines 21, 51 and 52 to a gate 53 where it is held. At the same time it is directed on line 51 to be the first input to a comparator 67 designed to compare the vector signal on line 51 with a previously monitored vector signal stored in a sample and hold amplifier circuit 54. Specifically, sample and hold amplifier circuit 54 has stored within it the smallest vector distance that has so far been determined. The signal from this circuit 54 is directed on line 55 to be the second input to comparator 67. If the previously smallest vector in circuit 54 is smaller than the new vector coming in on line 51, there will be no output from the comparator 67. If, however, the new vector is smaller than that stored in circuit 54, a signal will be produced by the comparator on line 68. This comparator output signal will be one input to an AND gate 69, the other input of which is a time delay signal on line 71 from a delay timer 72b provided to hold the signal for a time $T_2$ to ensure that all signals have stabilized and to ensure that all previous data manipulations have been performed as will be explained in detail hereinafter. When gate 69 is enabled, a signal will be passed on lines 61 and 73 to open gate 53 and allow the new vector distance on line 52 to be read into and stored in sample and hold circuit 54 as the new smallest vector. If the vector coming in on line 21 is actually the first vector being processed, the same procedure can be followed except that the sample and hold amplifier can be preloaded with a signal that is great enough to ensure that the incoming signal will be smaller than it.

At the same time that new class data was directed from the digital memory to the vector computer to be processed, a code signal from the memory 12 was directed on a line 44 as the first input to AND gate circuit 62. This code is a multiple bit binary word identifying the particular class to which the vector distance signal coming in on line 21 is directed and gate circuit 62, in actuality, comprises a large array of gates capable of passing multiple bit binary words, which circuits are well known in the art. When the comparator 67 determines that the new vector is smaller than that which was previously stored in sample and hold circuit 54 the signal ultimately produced on line 61 will enable gate circuit 62, and the code identifying that new vector distance will be stored in a buffer 63.

Thus, at this point in the operation of the selector circuit of FIG. 4, sample and hold amplifier circuit 54 contains the shortest vector distance so far measured while buffer 63 contains a code to identify the class associated with that vector. As new vector distances are continually computed in vector computer 13 and fed into the selector 14 on line 21, new comparisons are made so that after the vector distance from the unknown sample to each of the classes has been measured and compared with one another, sample and hold amplifier 54 will contain the shortest vector distance and buffer 63 will contain the code identifying the class that is the shortest vector distance from the unknown blood cell. A clock 46 (FIG. 1) is provided to start and sequence the selection process by shifting new class data in memory 12 in position to be read out into the vector computer 13 after a time $T_3$ which is long enough to ensure that all prior processing has been completed. By reading out the code in buffer 63 at the end of the process, we have, therefore, identified that class which is the shortest vector distance from the unknown event and hence the class with which the unknown event will be designated.

If all the parameters involved in designating the class to which the unknown blood cell belongs were perfect our job would now be substantially finished. Unfortunately, however, this is essentially never the case. In real life, the class aim points from which the vector distances to the unknown cell were measured may have been inaccurate due to the fact that only a finite number of samples were taken to locate it. Further, the instruments that were utilized to measure the requisite properties of our samples are imperfect. Also, the properties measured may not be constants but may vary. Finally, the system itself has inherent in it a certain amount of noise which can affect the accuracy of our designation. Accordingly, to have an effective system, substantial additional capabilities must generally be provided.

Let us first examine the problem of noise. The maximum amount of noise in a system can be determined with substantial accuracy utilizing known techniques and this noise can be described as a noise vector which can render the vector distances computed in the vector computer inaccurate by an amount equal to or less than the maximum noise vector. In order to determine whether this noise may have rendered our measurements inaccurate, it is necessary to examine the next closest class from the one selected and determine whether the difference between the shortest and second shortest vectors is greater than or less than the maximum noise vector. If the difference is greater, then we can be confident that the noise in the system has not affected our designation. If, however, the noise vector is equal to or greater than the difference, we have determined that the noise has made our designation ambiguous.

The capability for making this determination is provided in the selector circuit 14 and reference is again made to FIG. 4.

Specifically, in FIG. 4, in addition to sample and hold amplifier circuit 54 and buffer 63 which store the shortest vector distance and the code identifying the class associated with that vector distance, respectively, the circuit is also provided with a second sample and hold amplifier 59 and a second buffer 87 adapted to hold the second shortest vector distance and the code identifying its associated class, respectively. Processing of this next to shortest vector information is accomplished in one of two ways. First let's assume that the incoming vector distance signal on line 21 from the vector computer was not the new smallest vector. In this case, the vector stored in sample and hold circuit 54 will remain there. The incoming signal on line 21, however, will also be directed on lines 56 and 57 to a gate 58. Also, that signal is fed to be one input to a comparator 79. The second input to comparator 79 is the signal from sample and hold amplifier circuit 59 on line 88 which stores the second smallest vector distance that has been determined thus far. If the signal on line 56 is smaller than the second smallest vector stored in 59, a signal will be produced at the output 78 of comparator 79 and this signal will be one input to an AND gate 76. The second signal will be controlled by comparator 67 and inverter 112 on line 77 while the third signal will be from a time delay circuit 72a on line 81 which holds the signal for a settling time $T_1$ which is less than $T_2$. When gate 76 is enabled, a signal on line 82 and line 74 will open the gate 58 to allow this new second shortest vector to be stored in sample and hold amplifier circuit 59. Also, the code identifying the class associated with that particular vector distance on line 44 will be directed along line 89, AND gate circuit 83, and OR gate circuit 84 into buffer 87 to be stored therein.

Now let us consider the second possibility that a comparison has just been made by comparator 67 and a new smallest vector has been found. This vector will be stored in sample and hold amplifier circuit 54 as described previously. The vector that was previously stored in sample and hold amplifier circuit 54, therefore, now becomes the new second smallest vector and, accordingly, must be first transferred into sample and hold amplifier circuit 59. This is accomplished by directing the signal from amplifier circuit 54 along lines 55 and 91 through gate 92 to line 103 and into circuit 59. Gate 92 will be enabled through a signal from AND gate 94 upon receiving a signal on line 93 from the output of the comparator 67 and a timing signal $T_1$ on line 81. Also, the code stored in buffer 63 will be transferred to buffer 87 through AND gate circuit 86 and OR gate 84. Because time $T_1$ is less than time $T_2$, transfer of the vector to circuit 59 from circuit 54 will be accomplished before the new vector is fed into circuit 54.

Accordingly, after all vectors have been compared with one another we will have in sample and hold circuit 59 the second smallest vector distance and in buffer 87 the class code identifying the class with which that vector is associated.

To then determine whether the difference between the shortest and second shortest vector distances is greater than or less than the noise vector we must compare the two vector distances stored in sample and hold circuits 54 and 59. This is accomplished by directing signals from them on lines 97 and 98 to a difference amplifier 99 and a vector difference encoder 99a which will compare the maximum error vector and the difference between the two stored vectors. If the output shows that the error vector is greater than the difference between the smallest and next to smallest vectors we know that our designation is ambiguous.

The effect of this ambiguity can be better understood by means of another graphical explanation.

Figure 5:
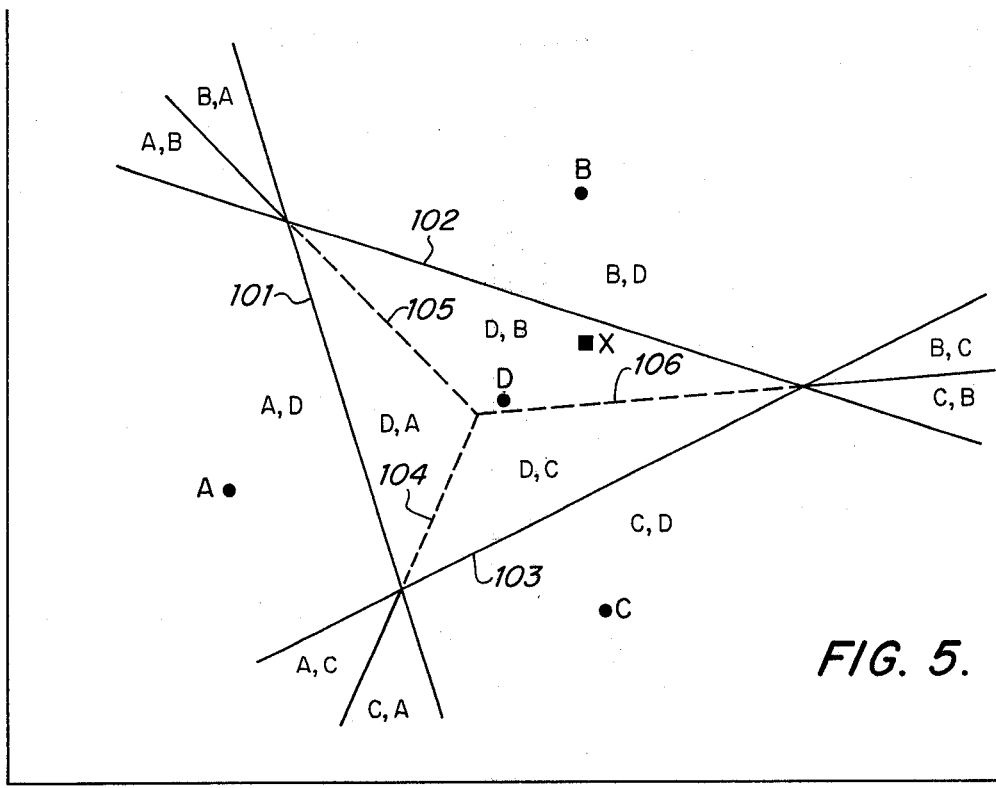

FIG. 5 illustrates the plot of our four class aim points A, B, C and D and our unknown X as was described in FIG. 2. As mentioned previously, the points A, B, C and D in most instances are not actual class positions but are aim points from which our measurements are made. In fact, in our particular blood cell example, blood cells may differ in their properties to a substantial extent and still all fall within the same general class. Accordingly, a particular blood cell class will not occupy only a point in our multidimensional coordinate system, but a domain. In our two-dimensional example, in other words, each class A, B, C and D will occupy different areas of the coordinate system and every measurement or sample falling within a specific area will be designated as being in that class. This is effectively what was done in our previous vector determination and can be shown graphically by drawing lines bisecting the vectors connecting each of the class aim points with each of the other class aim points. This is shown in FIG. 5 in which line 101 bisects the vector between class aim points A and D line 102 bisects the vector drawn between points B and D, line 103 bisects C and D, line 104 bisects A and C, line 105 bisects A and B, and line 106 bisects class aim points B and C. As can be seen in FIG. 5, these bisectors have the effect of separating our two-dimensional coordinate system into several discrete areas. For example, lines 101, 102 and 103 form a triangular boundary separating Class D from each of the other classes. Any sample which falls anywhere within that triangular area will be closer in vector distance to point D than any of the other class aim points and accordingly will be designated with Class D. In like manner, any sample falling outside this area will be designated with Class A, B or C depending on where it falls. As shown in FIG. 5, point X falls within the triangle bounded by lines 101, 102 and 103 and, accordingly it was designated in Class D.

Still referring to FIG. 5, it can be seen that the bisectors 104, 105 and 106 have resulted in further divisions of the coordinate system. Specifically, they have defined subdivisions within each of the class areas. For example, in area D, we have subdivisions D,A; D,B; and D,C. If X falls in subdivision D,B, as shown, this means that it is designated into Class D but that the second closest class is Class B. Accordingly, this graphically illustrates that if our noise vector was such that our designation is ambiguous, our sample is probably classified in Class D but if not, then it is probably in Class B.

Figure 6:
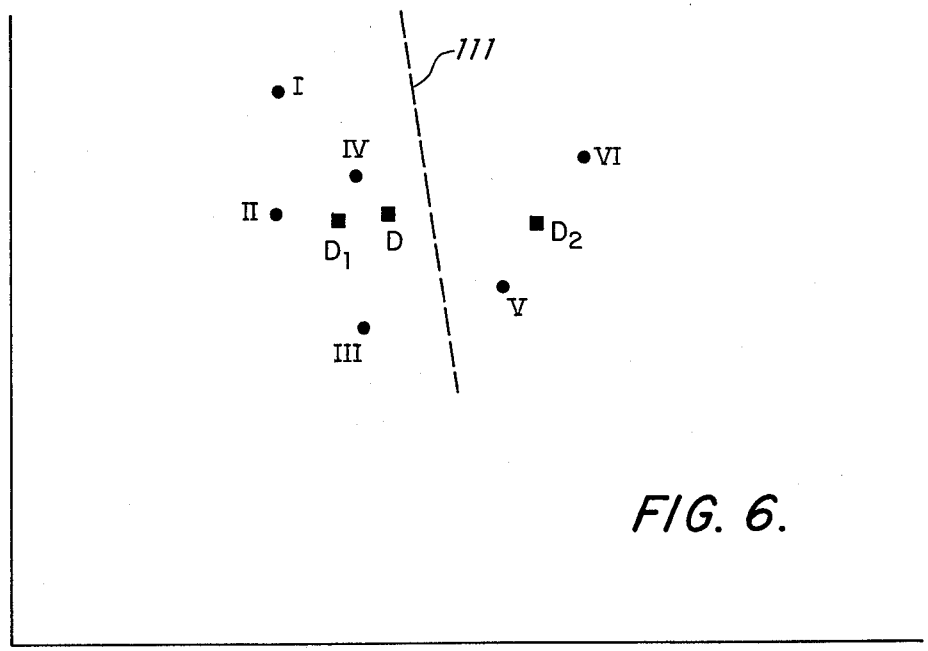
FIG. 5–7 are graphical representations illustrating some of the capabilities of the present invention.
Figure 7:
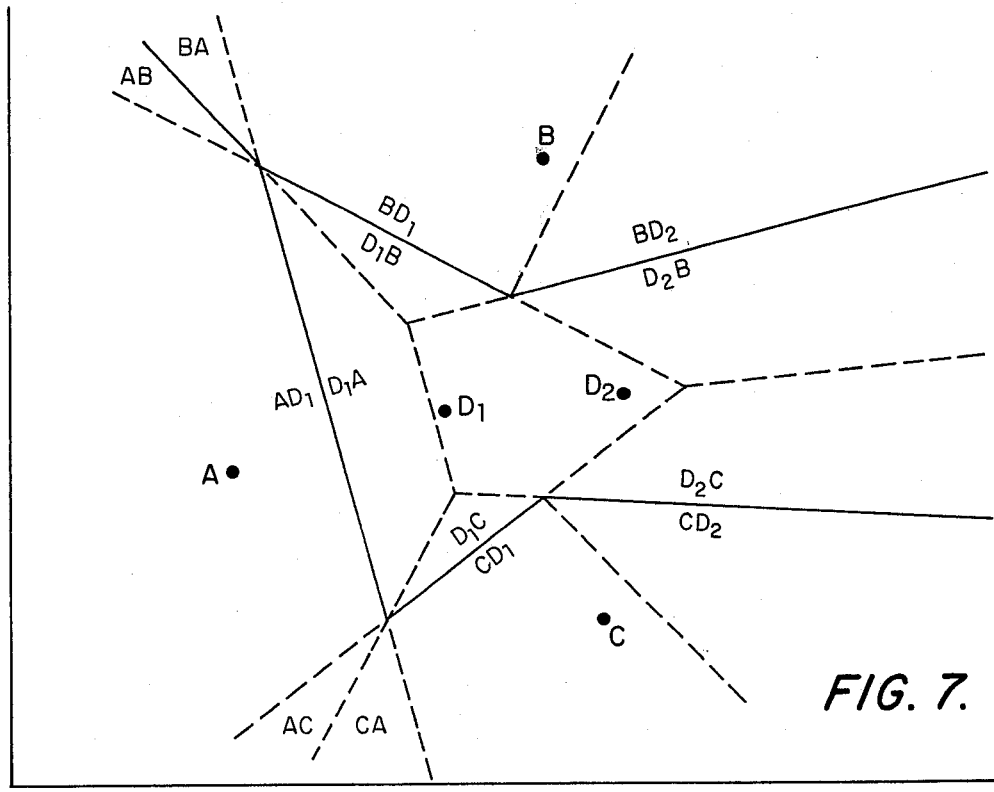

FIG. 5 together with FIGS. 6 and 7 can also assist in explaining some of the other capabilities provided by the present invention. Let us now assume that we have examined a great many unknown blood cells and have designated their class as described above. In doing so, let it also be assumed that all or essentially all of those cells assigned to Class D happened to fall in the D,B subdivision and not in subdivisions D,C or D,A. This non-uniform distribution might be caused by several things. It might be caused merely by chance or by some defect in our measuring equipment. Also, however, it might indicate that our class aim points and, particularly, the Class D aim point is inaccurate. This is a distinct possibility because of the manner in which the aim points were determined as will be explained hereinafter. Another indication of a possible error in the aim point position might be apparent when a sample that we know belongs in a certain class is not designated into the proper class (i.e., a sample we know is in Class D but falls in a Class B domain.)

FIGS. 6 and 7 illustrate a technique by which the domains can be more accurately defined than in FIG. 5 and is particularly useful in situations where class domains are irregular or elongated due to disparate property values for samples falling within the same class. First, with reference to FIG. 6, let it be assumed that in establishing the aim point "D" of FIG. 5, we measured the properties of six different samples known to be in Class D and that a plot of these individual samples in the coordinate system resulted in the points I through VI. To perform our previously described vector calculations it was necessary to define an aim point that most accurately represents all the samples in the class. Without further information the best initial guess for the aim point will be the mean of the various measurements, which can be calculated by determining the average value of each property for each of the samples and plotting the class into the coordinate system using these mean values. This turned out to be the aim point D that was used in FIGS. 2 and 5. If we have reason to believe, however, that point D is not a proper aim point for the class (if, for example, for one of the reasons above) the present invention provides a way for more precisely defining the domain boundaries utilizing a self-training capability. repeated One technique for accomplishing this is a partitioning operation consisting of first finding the two samples in the class that are farthest apart, i.e., points II and VI in FIG. 6 and then finding each of the remaining points that are closest to these two. This is equivalent to bisecting a line between points II and VI to establish two subclasses. This bisector is illustrated as line 111. It can now be seen that points I, III and IV all fall closer to point II and are on one side of bisector 111 while point V falls closer to point VI and is on the other side of bisector 111. We now determine the mean values of the two new sets of points to establish two new subclass aim points which are illustrated as $D_1$ and $D_2$. These become two new aim points to be employed in place of the aim point D that was used in FIGS. 2 and 5, and our computations are reppeated now using $D_1$ and $D_2$ as aim points instead of D. This is illustrated in FIG. 7 where it can be seen that a new, more precise devision of the two-dimensional space has been carried out. The new domain for Class D is that area bounded by solid lines. If there are still errors, we can, for example, then further partition subclass $D_1$ as above to establish new aim points $D_{1-1}$ and $D_{1-2}$. In a similar manner Classes A, B and C may also be subdivided. This process may be continued until all points have been partitioned or until no errors occur (e.g., all known samples fall in the proper domain). In this manner, we can finally establish correct domains for designating unknown samples which may later be measured. If errors still occur, this is a good indication that, perhaps, all significant properties were not taken into consideration.

The structures for doing these manipulations are illustrated in FIGS. 1, 3 and 4. Specifically, as shown in FIGS. 1 and 3, gates 113 and 114, etc. enabled by a signal on line 116 are provided to direct the property information for one sample within a class (e.g., point I) on lines 99 to the signal conditioner 11 to be treated in the same manner as the unknown sample in the earlier described example. Each point may then be compared with every other point making up the class (e.g., points II-VI) so that appropriate vector distances may be computed. These distances are directed to the selector which is provided with additional circuitry (only schematically shown for clarity for changing the inputs to the comparators so that instead of finding the closest classifier, the furthest is found) for determining and storing longest vector distances (as well as next to longest distances to check for noise errors). Additional comparators, sample and hold circuits, etc., may also be provided if desired. When the largest vector distance is determined, e.g., from point II to point VI, the remaining points will be assigned to one or the other of these points, new aim points will be established and previously described processes repeated. The various sample points can be readily kept track of by giving them identification codes as before.

Thus, it should be evident that by proper use of the designating system in accordance with the present invention it is possible to categorize essentially any type of event or observation into a known category. In order to use the system for different applications, it is only necessary to change the input data and thus the system may be utilized as a general purpose system without any significant modification. The number of properties to be considered is a function only of the number of channels provided and the storage capability of the memory, and since a computer can operate effective in a great many dimensions this is no limitation to the system. The number of possible classes into which an unknown event might be classified is also no limitation. Furthermore, as indicated above, the system is effective not only to designate the class into which a particular item falls but can also provide information as to whether the solution is ambiguous due to noise or other causess, and if so, identify the second most likely class that the item would be classified in. By selectively setting one or more of the coordinates in the coordinate system equal to zero, i.e., by disregarding selected properties, it can be determined whether certain properties are irrelevant to the classification or whether they are in fact important to it. This can be done by the use of Don't Care gates 121, 122, etc., (FIG. 3) enabled by inhibit signals on lines 126, 127, etc., respectively. Furthermore, by proper use of these gates, it is possible to encode input data from the signal conditioner into the memory for storage as class entries. This can be done by applying a digital counter to lines 19a, 19b, etc., enabling all of the Don't Care gates 121, 122, etc. but one and changing the count in the counter until, for example, the signal on line 18a is equal to the signal on line 34. When this is the case, the counter will have a digital signal corresponding to the input analog signal on line 18a and this can be stored in the memory. Data from other channels can be processed in the same manner. This analog to digital conversion technique enables one to establish new class data from many samples to be used in establishing domains as described above. Also, the existence of any subclassifications can also be recognized and ascertained by recognizing any clustering of samples that might occur. Finally, to some extent, the system can also suggest that a relevant property may have been omitted from the designations operation.

In general, what has been provided is a highly effective general purpose designator having immense applicability. Although what has been described is the presently most preferred embodiment, it should be apparent to those skilled in the art that the sequence of operations and the circuitry employed could take many other forms. Accordingly, it should be understood that the invention should be limited only as required by the scope of the following claims.

What is claimed is:

1. Apparatus for designating the class to which an unknown event belongs among a plurality of possible classes of events, which classes differ from one another by the values of one or more of a plurality of selected properties thereof; said apparatus comprising:
   a. means for generating a first plurality of signals which identify the position of said unknown event as a function of its selected property values in a multidimensional coordinate system wherein each axis corresponds to a different one of said plurality of selected properties;
   b. means for generating a second plurality of signals which identify the position of each of said classes in said multidimensional coordinate system as a function of their values of said selected properties;
   c. first comparing means for comparing said first plurality of signals with said second plurality of signals and for generating a third plurality of signals, each of which is proportional to the vector distance between the position of said unknown event and the position of a different one of said classes in said multidimensional coordinate system;
   d. second comparing means for comparing said third plurality of signals with one another for determining that third signal which is proportional to the shortest vector distance; and,
   e. means for identifying the particular class associated with the third signal proportional to the shortest vector distance for designating said unknown event into that particular class.

2. Apparatus as recited in claim 1 wherein each of said first plurality of signals comprise signals proportional to the value of a different one of said selected properties of said unknown event and wherein each of said second plurality of signals comprise signals proportional to the value of a different one of said selected properties of each of said plurality of classes.

3. Apparatus as recited in claim 2 wherein said first comparing means comprises means for comparing said first plurality of signals with the second plurality of signals for each class in a class-by-class sequence.

4. Apparatus as recited in claim 3 wherein said first comparing means further comprises means for substantially simultaneously comparing, for each of the classes in sequence, each of said first plurality of signals with the corresponding one of said second plurality of signals that is proportional to the value of the same selected property.

5. Apparatus as recited in claim 3 wherein said first comparing means further comprises:
   a. means for comparing, for each of said classes in sequence, each of said first plurality of signals with the corresponding one of said second plurality of signals that is proportional to the value of the same selected property and for generating difference signals proportional to the difference between the values of said corresponding selected properties;
   b. means for squaring each of said difference signals; and,
   c. means for adding each of said squared difference signals for producing said third plurality of signals.

6. Apparatus as recited in claim 3 wherein said means for generating said first plurality of signals comprises a first plurality of input channels for carrying said first plurality of signals and wherein said means for generating said second plurality of signals comprises a second plurality of input channels for carrying said second plurality of signals.

7. Apparatus as recited in claim 6 wherein said means for generating a first plurality of signals further comprises signal conditioning means for receiving said first plurality of input signals from said first plurality of input channels and for converting at least one of said first plurality of signals into a more meaningful form for comparison with said second plurality of signals.

8. Apparatus as recited in claim 6 wherein said means for generating a second plurality of signals includes memory means for storing the values of each of said selected properties for each of said plurality of classes.

9. Apparatus as recited in claim 8 wherein said memory means comprises a digital memory for storing digital data representing the values of each of said selected properties for each of said plurality of classes; and wherein said means for generating a second plurality of signals further comprises a plurality of digital to analog converter means associated with each of said second plurality of input channels for converting said digital data into analog signals proportional to the values of said selected properties for each of said plurality of classes.

10. Apparatus as recited in claim 3 wherein said second comparing means comprises means for comparing said third plurality of signals with one another in sequence.

11. Apparatus as recited in claim 9 wherein said second comparing means further comprises:
   a. means for storing one of said plurality of third signals;
   b. third signal comparator means for comparing said stored third signal with another third signal and for generating a comparator signal when said other third signal is proportional to a shorter vector distance than said stored third signal; and,
   c. means responsive to said comparator signal for replacing said stored third signal with said other third signal in said storing means, whereby said storing means will contain the third signal proportional to the shortest vector distance from said unknown event position to each of said plurality of class positions upon completion of said sequential comparison.

12. Apparatus as recited in claim 11 wherein said identifying means includes buffer storage means for storing a code identifying the class associated with that third signal which is stored in said storing means at any particular time whereby said buffer storage means will contain a code identifying the class associated with said third signal associated with said shortest vector distance upon completion of said sequential comparison.

13. Apparatus as recited in claim 12 and further including means for changing the code in said buffer storage means when a different third signal is stored in said storing means.

14. Apparatus as recited in claim 3 wherein said second comparing means further includes means for storing the third signal proportional to the second shortest vector distance between said unknown event position and said plurality of class positions.

15. Apparatus as recited in claim 14 wherein said identifying means further includes second buffer storage means for storing a code identifying the class associated with said third signal proportional to said second shortest vector distance.

16. Apparatus as recited in claim 15 and further including means for comparing the third signal proportional to said shortest vector distance with said third signal proportional to said second shortest vector distance for indicating the possible effect of noise on the accuracy of said designation operation.

17. Apparatus as recited in claim 3 wherein said second comparing means further includes means for storing the third signal proportional to the longest vector distance between the position of said unknown event and the position of said plurality of classes.

18. Apparatus as recited in claim 3 and further including means for coupling said means for generating said second plurality of signals to said means for generating said first plurality of signals whereby a second plurality of signals associated with one class may be compared with a second plurality of signals associated with another class and whereby a first plurality of signals associated with one unknown event may be compared with a first plurality of signals associated with another unknown event.

19. Apparatus as recited in claim 2 wherein said second plurality of signals for at least one of said classes comprise signals proportional to the mean value of each of said selected property values for a plurality of sample events, each of which are known to belong to said one class.

* * * * *